(12) United States Patent
Mitchell et al.

(10) Patent No.: US 10,783,434 B1
(45) Date of Patent: Sep. 22, 2020

(54) METHOD OF TRAINING A SOUND EVENT RECOGNITION SYSTEM

(71) Applicant: Audio Analytic Ltd, Cambridgeshire (GB)

(72) Inventors: Christopher James Mitchell, Cambridgeshire (GB); Sacha Krstulovic, Cambridgeshire (GB); Cagdas Bilen, Cambridgeshire (GB); Juan Azcarreta Ortiz, Cambridgeshire (GB); Giacomo Ferroni, Cambridgeshire (GB); Arnoldas Jasonas, Cambridgeshire (GB); Francesco Tuveri, Cambridgeshire (GB)

(73) Assignee: AUDIO ANALYTIC LTD (GB)

( * ) Notice: Subject to any disclaimer, the term of this patent is extended or adjusted under 35 U.S.C. 154(b) by 0 days.

(21) Appl. No.: 16/594,605

(22) Filed: Oct. 7, 2019

(51) Int. Cl.
*G10L 25/30* (2013.01)
*G06N 3/08* (2006.01)
*G06N 3/04* (2006.01)
*G10L 25/51* (2013.01)

(52) U.S. Cl.
CPC .............. *G06N 3/08* (2013.01); *G06N 3/0445* (2013.01); *G10L 25/30* (2013.01); *G10L 25/51* (2013.01)

(58) Field of Classification Search
CPC ......... G10L 25/30; G10L 25/45; G10L 25/87; G10L 25/93; G10L 2025/932; G10L 2025/935; G10L 15/16
See application file for complete search history.

(56) References Cited

U.S. PATENT DOCUMENTS

| 5,774,837 | A | * | 6/1998 | Yeldener | G10L 19/12 704/206 |
| 2010/0280827 | A1 | * | 11/2010 | Mukerjee | G10L 15/197 704/236 |
| 2016/0260426 | A1 | * | 9/2016 | Kim | G10L 15/05 |
| 2017/0372725 | A1 | * | 12/2017 | Khoury | G10L 25/78 |

* cited by examiner

*Primary Examiner* — Kile O Blair
(74) *Attorney, Agent, or Firm* — Tarolli, Sundheim, Covell & Tummino LLP (57) ABSTRACT

A method of training a non-verbal sound class detection machine learning system, the non-verbal sound class detection machine learning system comprising a machine learning model configured to: receive data for each frame of a sequence of frames of audio data obtained from an audio signal; for each frame of the sequence of frames: process the data for multiple frames; and output data for at least one sound class score representative of a degree of affiliation of the frame with at least one sound class of a plurality of sound classes, wherein the plurality of sound classes comprises: one or more target sound classes; and a non-target sound class representative of an absence of each of the one or more target sound classes; wherein the method comprises: training the machine learning model using a loss function.

18 Claims, 4 Drawing Sheets

METHOD OF TRAINING A SOUND EVENT RECOGNITION SYSTEM

FIELD OF THE INVENTION

This invention generally relates to training a system to recognise non-verbal sound events and/or scenes.

BACKGROUND

Background information on sound identification systems and methods can be found in the applicant's PCT application WO2010/070314.

SUMMARY

According to a first aspect, there is provided a method of training a non-verbal sound class detection machine learning system. The non-verbal sound class detection machine learning system may comprise a machine learning model. The machine learning model may be configured to receive data for each frame of a sequence of frames of audio sound data obtained from an audio signal. The machine learning model may be configured to, for each frame of the sequence of frames, process the data for multiple frames. The machine learning model may be configured to, for each frame of the sequence of frames, output data for at least one sound class score representative of a degree of affiliation of the frame with at least one sound class of a plurality of sound classes. The plurality of sound classes may comprise one or more target sound classes. The plurality of sound classes may comprise a non-target sound class representative of an absence of each of the one or more target sound classes. The method may comprise training the machine learning model using a loss function comprising at least one of: a first term which, for each frame representative of the absence of each of the one or more target sound classes, penalises one or more sound class scores, wherein the one or more sound class scores are associated with at least one of the one or more target sound classes; a second term which, for a group of frames representative of one of the one or more target sound classes, penalises a combination of one or more sound class scores, wherein the one or more sound class scores are associated with the one of the one or more target sound classes; a third term which, for each frame of a plurality of frames, penalises a non-smooth change of one or more sound class scores across the plurality of frames; and a fourth term which, for each a frame representative of a first target sound class of the one or more target sound classes, penalises one or more sound class scores, wherein the one or more sound class scores are associated with at least a second target sound class of the one or more target sound classes.

A loss function may also be referred to as a cost function.

A non-verbal sound class detection machine learning system may be used to recognise at least one of a non-verbal sound event and a scene in an audio signal comprising a sequence of frames of audio data.

A non-verbal sound event and/or scene may be a sound resulting from an event and/or scene and/or action. Examples of a non-verbal sound event may be a baby crying, a gun shooting, a dog barking. A further example of a non-verbal sound event is recognising a presence of a person talking, in other words a method for recognising a non-verbal sound event and/or scene may include a method that comprises determining that a person is speaking (or other details such as when a person has started and stopped speaking, or determining that more than one person is speaking). A method for recognising a non-verbal sound event and/or scene may not comprise recognising and, for example transcribing, exact words of speech, such methods fall within speech recognition.

A sequence of frames of audio sound data may be obtained from an audio signal. An audio signal may be an analogue or digital audio signal captured by a sound capturing device such as a microphone or a microphone array. If the audio signal is an analogue signal then the method may comprise converting the analogue signal into a digital signal using, for example, an Analog to Digital Converter (ADC).

The audio signal may be defined as a sequence of frames. Each frame may cover approximately 0.032 s of sound sampled every 0.016 s. The sequence denotes that the frames have a chronological order. The frames may be samples taken at regular intervals from a continuous time series (such as the audio signal). As the samples (i.e. frames) may be taken at regular intervals, defined by a sampling rate, time may be equivalently expressed in standard time units (i.e., minutes, seconds, milliseconds etc.) or as a number of frames. For example, in a digital system where the sampling rate is 16 kHz, which means 16,000 samples per second, a duration of 16 milliseconds can be equivalently expressed as 256 samples: 0.016 seconds times 16,000 samples per second equals 256 samples.

The frames of audio data may contain time domain waveform samples or Fourier domain spectrum samples. The frames of audio data may comprise one or more time domain waveform samples or one or more Fourier domain spectrum samples.

Processing a frame of audio data may comprise processing one or more of a time domain waveform sample and a Fourier domain waveform sample, where the time domain waveform sample and Fourier domain waveform sample correspond to audio from a same point in time in the audio signal, and where the result of processing is one or several vector(s) of acoustic features. Processing a frame of audio may comprise performing one or more signal processing algorithms on the frame of audio data. Additionally or alternatively, processing a frame of audio data may comprise using a regression method. The regression method may consist in feature learning. Feature learning may be implemented, e.g., by training an artificial neural network (ANN) to produce acoustic features. In such a case, the neural network may be trained to produce bottleneck features, i.e., features output by a bottleneck layer, where an embedding of a previously trained neural network model is an input to a further neural network. Extracting a variety of features is advantageous because it can provide for more degrees of freedom when optimising the system towards accurate classification of the frame.

One or more of the extracted acoustic features may be a ideophonic feature such as an acoustic feature representing a level of beepiness' associated with a frame of audio data (other examples may be a level of 'suddenness' or 'harmonicity').

A machine learning model may be a neural network, such as a recurrent neural network or a feed forward neural network. A machine learning model may be a Gaussian mixture model, a hidden Markov model or a support vector machine. A machine learning model may be any machine that is configured to output frame scores. A machine learning model comprises parameters that can be optimised with the objective of minimising a loss function between frame scores and ground truth labels.

The machine learning model is configured to receive data. In embodiments the data may be the audio sound data, obtained from an audio signal, for each frame. In embodiments, the data may be data derived or otherwise associated with the audio sound data for each frame, for example, the data may be a plurality of acoustic features extracted from the audio sound data for each frame. In embodiments, the data may be one or more sound class scores, for each frame, which may identify a degree of affiliation that each frame has to a sound class, for example, the data may comprise a probability, for each frame, that one or more audio event and/or scene occurred during a time corresponding to the frame. In embodiments, the data may be a hard (or soft) decision that the frame corresponds to one or more sound class.

A sound class may be a non-verbal sound that can be recognised from an audio signal by the described method. Sound classes can be representative of, indicators of, or associated with, non-verbal sound event and/or scene, for example a sound class may be "baby crying", "dog barking" or "female speaking". Additionally or alternatively, sound classes can be representative of, indicators of, or associated with, audio scenes, where an audio scene is for example "railway station" or "family dinner". Sound classes can have various levels of precision in their definition, for example "loud crash", "anomaly" or "noisy room" are possible sound classes, which may be considered to be less focused than a sound class of 'baby crying'.

A non-verbal sound event may be referred to as an audio event. An audio event may be a manifestation of a sound class at a time and/or for a duration. For example, "smoke alarm sounding for 10 seconds" or "baby crying between 12:15 and 12:17 today" are examples of non-verbal sound event events.

A sound scene may be referred to as an audio scene; a sound scene may be an environment characterized by a set of expected sounds or sound types. An audio scene may be recognised by recognising and processing a number of audio events. An audio scene may be indicative of a particular context. Examples of audio scenes are a "railway station" (which may be defined by a composite mixture of audio events such as train sounds, crowd sounds etc.) and a "family dinner" (defined by a composite mixture of audio events such as crockery sounds, conversations, chewing sounds etc.).

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio event and/or scenes (that have a corresponding target sound class) in a frame then the frame will be classified as having a non-target sound class.

For each of the set of sound classes, a score is determined that the frame represents the sound class. The score may identify a degree of affiliation that each frame has to a sound class. The score may be a probability, in which case a summation of the score for each of the set of sound classes equals one. If it is desirable to perform a method that outputs only a single sound class for each frame, then it can be advantageous to have the score as a probability. The score may be referred to as a class affiliation score where the score represents the level of affiliation that a frame has with a sound class. The score may be a distance or any other measurement that represents a level of affiliation that a frame has with a sound class. In other words, the score may not be a probability. Advantageously, if the score is not a probability then it is possible to perform a method that recognises sounds that overlap with respect to time because the method allows for determining more than one sound event and/or scene associated with a frame.

The machine learning model may be configured to output data for at least one sound class score for the frame for classification of the frame as at least one sound class of a plurality of sound classes. The outputted data could be a value and/or parameters of a distribution. The outputted data may be derived or otherwise associated with the audio sound data for each frame, for example, the outputted data may be a plurality of acoustic features extracted from the audio sound data for each frame. In embodiments, the outputted data may be one or more sound class scores for each frame, for example, the outputted data may comprise a probability, for each frame, that one or more audio event and/or scene occurred during a time corresponding to the frame. In embodiments, the data may be a hard (or soft) decision that the frame corresponds to one or more sound class.

Consequently, the outputted data may be used for at least one sound class score for the frame for classification of the frame as at least one sound class of a plurality of sound classes. For example, if the outputted data comprises a probability, for each frame, that one or more audio event and/or scene occurred during a time corresponding to the frame, then the outputted data may be processed to generate a decision that one or more audio event and/or scene occurred during a time corresponding to the frame. Therefore, the outputted data (e.g. the probabilities) can be used to classify the frame as one or more audio event and/or scene. In embodiments, the outputted data may be acoustic features for a frame. Such acoustic features can be processed to classify the frame, for example, the acoustic features for a frame can be classified as one or more audio event and/or scenes.

The one or more target sound classes may correspond to one or more events and/or scenes. For example, a target sound class may correspond to, or be associated with, an event such as a 'baby cry' or a 'dog bark'. A target sound class may correspond to, or be associated with, a scene such as 'a railway station' or 'a kitchen'.

A non-target sound class may be representative of an absence of each of the one or more target sound classes. For example, in embodiments there may only be target sound classes of 'gunshot' and 'shouting voice', in this example, if no 'gunshots' or 'shouting voices' are present (for example if there was only a 'dog bark') then the frame may be classified (using the outputted data) as the non-target sound class representative of an absence of each of the one or more target sound classes. In other words, a non-target sound class, representative of an absence of each of the one or more target sound classes, may represent an absence of any event and/or scene or may represent an absence of any of the target sound classes.

Some systems train a machine learning model to classify a plurality of frames individually at a first stage and perform a second stage to train the final sound event classification based on grouping the classified frames. Resorting to a two-stage optimisation does not necessarily result in an accurately recognising events and/or scenes. For example, if at the first stage, a system A was better than system B, this does not necessarily mean that that system A will still be the best after the second stage of training.

In contrast, embodiments of the present cost function described in this application include frame grouping directly at the training level, which results in the machine learning model having parameters that are trained for event and/or scene recognition rather than for frame classification. This results in a machine learning model that has a higher accuracy in recognising sound events and/or scenes than known systems.

In other words, rather than minimising a cost functions that considers only the classification of each audio frame individually, embodiments of the present invention comprise a cost function which directly optimises the classification of potentially multi-frame events and/or scenes without resorting to an additional optimisation stage.

Better sound recognition quality is achieved by training a machine learning model using the loss function described in embodiments of the invention.

Sound classification may be evaluated using a metric of true positive rate (TP, the percentage of target sound events correctly recognised) and false positives per unit of time (FP, e.g. false positives per months, i.e., other sounds than the target sound event which were wrongly detected as the target). However, as explained above, some training methods are designed to optimise the classification of sound frames (short windows of digital audio, typically 32 ms long with a hop size of 16 ms), rather than optimising the classification of full audio events (e.g. a full 1.5 second of smoke alarm sound rather than each of the 94 corresponding frames one-by-one). This introduces discrepancies in classification and therefore results in lower sound recognition performance when compared to machine learning models trained using a loss function described in the present application. The inventors have determined that the best machine learning model for frame classification may not be the best machine learning model for event and/or scene classification.

Thus, embodiments of the present invention advantageously are trained using a cost function which satisfies, for example a criteria of continuity across longer horizons (i.e. a longer time frame) than single frames. This integrates a concept of full audio events into the machine learning model training, and yields better sound recognition performance. In other words, embodiments of the present invention improve TP/FP rates at the level of event and/or scene recognition rather than at the frame classification level, which makes the objective of the training closer to the actual objective of event and/or scene recognition, which is to recognise events and/or scenes rather than individual audio frames.

A first term may penalise one or more sound class scores, for each frame representative of the absence of each of the one or more target sound classes. In other words, the first term may only be calculated for frames that have a ground truth of the non-target class (i.e. representative of the absence of each of the one or more target sound classes). This may be expressed as the first term may only be calculated for frames that are labelled as the non-target class (i.e. the absence of each of the one or more target sound classes). For such a frame, the first term penalises one or more sound class scores that are associated with at least one of the one or more target sound classes. The first term therefore penalises false positives because the first term penalises the machine learning model outputting data for a frame indicating that the frame is associated with a target class, whereas the ground truth for the frame indicates there is no target class associated with the frame. In other words, the first term penalises detecting a target class for a frame when there are none. Even if the frame is eventually classified, for example by a hard decision, correctly as representative of the absence of each of the one or more target sound classes, the first term may still be non-zero, where zero indicates a perfect match of the frame with the corresponding label. For example, if the outputted data comprises a non-zero sound class score for a target sound class and a higher non-zero sound class score for the non-target sound class, a system (for example, a thresholding method) may correctly classify the frame as the non-target sound class. However, the first term may still penalise the non-zero sound class score for a target sound class irrespective of whether the frame is eventually correctly classified.

The first term may be a classification loss, for a frame representative of the absence of each of the one or more target sound classes, which penalises a difference between a ground truth label and the output data of the system. The ground truth label indicates where the frame is representative of the absence of each of the one or more target sound classes.

Non-target frames may be associated with false positives, hence the first term that is associated with these frames may be on a frame by frame basis. For this reason, a variant of cross-entropy may be used.

In other words, the first term may strongly penalise false detections.

The second term may penalise a combination of one or more sound class scores, for a group of frames representative of one of the one or more target sound classes, wherein the one or more sound class scores are associated with the one of the one or more target sound classes. The combination could be, for example, an average, a maximum, or a median of the one or more sound class scores.

The second term may be a classification loss based on a difference between: a ground truth label for a group of frames having the same ground truth label; and a combination of the output data for the group of frames. In other words the group of frames have been labelled as the same sound class. The combination may be a property of the scores of the group of frames. Calculating the second term may comprise analysing all (or multiple) frames having a target label, and processing the sound class scores for that target label. In embodiments, the second term penalises, for each of the plurality of sound classes, incorrect classification of a generated sound class score representative of a plurality of sound class scores for the sound class. In embodiments, the second term represents a weighted pooling within a label.

The second term may go to zero for a sound class as the sound class becomes correctly detected (as it approach TPs).

When attempting to recognise an event and/or scene, it is not necessarily required for the machine learning model to correctly classify every frame but rather, it may be possible to correctly classify only a percentage of frames and maintain, or improve on, a high level of accuracy with regards to recognising events and/or scenes. For example, for events having a short time duration, the inventors have determined that it may be desirable (and/or acceptable) to recognise a majority of the frames associated with the short event. Conversely, for an event having a long time duration, a recognition of a smaller percentage of the frames associated with the long event could be sufficient and/or lead to an improved event and/or scene recognition system.

Advantageously, the result of training the machine learning model using a loss function comprising the second term means that the machine learning model may not be trained to output correct data for every frame. Rather, the machine learning model may be trained to output correct data for a proportion of frames for each sound class.

The third term may determine a classification loss based on a non-smooth change of output data across a plurality of frames. The third term may penalise a non-smooth change of one or more sound class scores across a plurality of frames. The plurality of frames may be a sequence of successive frames. The plurality of frames may be a selection of frames situated within a time window.

The third term may penalise temporally consistent detections on a target label less than temporally inconsistent detections. In other words, chaotic detections/classifications of a target class may be penalised by the third term.

In embodiments, temporally continuous recognitions are preferable to temporally inconsistent recognitions as they are more likely to be considered as a recognition. This preference is enforced by embodiments of the third term because the third term penalises non-smooth changes in the target class.

The fourth term may only be calculated when there are more than one target sound classes. The fourth term may be a classification loss, for a frame representative of a first target sound class of the more than one target classes, which penalises a difference between a ground truth label and the output data of the system.

In other words, the fourth term may ensure that, for a target class, any false activation of other target classes are penalized. This is advantageous if missed detections are preferable to cross triggers, where cross triggers are when a first target class is recognised by the system when a second target class should have been recognised.

Embodiments of the first to third terms constrain the output data for a target class for frames having a ground truth of the target class. In embodiments, the fourth term increases as the other target classes, excluding the non-target class, are recognised for the frame, since missed detections are not as important as incorrectly classifying a frame as an incorrect target class.

In embodiments, the fourth term may be considered as a variant of the cross-entropy, that only applies to cross-triggers. Advantageously, the fourth term limits false detections of a target class as being another target class. The fourth term excludes any limitation with respect to the non-target class (i.e. events and/or scenes that are not associated with a class that the machine learning model is configured to detect). As such, the fourth term is not configured to penalise missed detections, and does not look at all at false triggers on the non-target class, both of these being dealt with by the other terms of the loss function. Or in other words, the first term considers a target class compared to the non-target class, whereas the fourth term penalises specifically the competition between target classes for recognition (and excludes the non-target class).

This is advantageous because users of the system generally have a more negative opinion if the system detects, for example, a baby cry as a dog barking, assuming both are part of the sound recognition offering, than if the baby cry is either completely missed or confused for a sound which was not part of the sound recognition offering at all.

The first term may determine:

$$\Sigma_{i=a\ non\text{-}target\ sound\ class} w_i \text{err}(x_i)$$

wherein i represents a frame having a ground truth of the non-target sound class representative of an absence of each of the one or more target sound classes, $w_i$ is a weighting for frame i, and $x_i$ represents one or more sound class scores for frame i output by the machine learning model. The $\text{err}(x_i)$ may represent a function that is configured to receive a value of $x_i \geq 0$ and output a value greater than or equal to zero.

In an embodiment, the first term may determine:

$$\Sigma_{i=a\ non\text{-}target\ sound\ class} y_i \text{err}(x_i)$$

wherein i represents a frame having a ground truth of the non-target sound class representative of an absence of each of the one or more target sound classes, $y_i$ is a sound class label for frame i, and $x_i$ represents one or more sound class scores for frame i output by the machine learning model. The $\text{err}(x_i)$ may represent a function that is configured to receive a value of $x_i \geq 0$ and output a value greater than or equal to zero.

The ground truth is an indication that the frame is a particular sound class. For example, training data may be used to train the machine learning model. For example, it may be known due to an observation that a 'baby cry' event occurred during the time period of a frame. The frame will then have a ground truth of 'baby cry'. The frame may have more than one ground truth if multiple events and/or scenes occur during the frame. The ground truth of a frame may be expressed in the sound class label $y_i$ for a frame. For example, the sound class label $y_i$ may be a vector having a value for each sound class. In this example, the sound class label may equal 1 for the dimension representing baby cry and zero for all other dimension. However, non-binary scores may be possible. Furthermore, the sound class label may have a value of one for multiple sound classes if multiple sound classes occurred during the frame.

In embodiments, $\text{err}(x_i) = -f(x_i)\log(x_i)$, wherein $f(x_i)$ may be a function configured to receive a value of $x_i \geq 0$ and output a value greater than or equal to zero. The function $\text{err}(x_i)$ may be referred to as an error function. In embodiments, $f(x_i) = (1-x_i)^\alpha$. In embodiments, a is a real number and preferably $\alpha=1$ or $\alpha=0$. However, $\alpha$ is tuneable and can be set by a user of the method of training. In embodiments, the first term may be a focal loss based term.

The second term may comprise a weighting. The second term may comprise a combination of one or more sound class scores. The second term may determine a product of: a weighting; and a combination of one or more sound class scores.

The second term may determine:

$$\Sigma_j w_j \text{err}(h(x_i, \forall i \in \text{label}_j))$$

wherein, j represents a target sound class, $w_j$ represents a weighting for the target sound class j, $x_i$ represents one or more sound class scores for a frame i output by the machine learning model, $\text{err}(h(x_i, \forall i \in \text{label}_j))$ may represent a function that is configured to receive a value of $h(x_i, \forall i \in \text{label}_j)$ and output a value greater than or equal to zero, wherein $h(x_i, \forall i \in \text{label}_j)$ represents a function configured to: receive multiple values of $x_i$, wherein each frame i has a ground truth of the target sound class j; combine the multiple values of $x_i$ to generate a combination; and output said combination.

The weighting may be different for each target sound class j.

The function $h(x_i, \forall i \in \text{label}_j)$ is configured to receive as an input, the output data for frames having a ground truth of a target label j. In embodiments, $h(x_i, \forall i \in \text{label}_j)$ is a pooling function. This means that the function $h(x_i, \forall i \in \text{label}_j)$ is configured to combine multiple inputs and to output one or more values representative of the multiple input.

In embodiments, the pooling function may be defined as $$h(x_i, \forall i \in label_j) = \frac{\sum_i x_i e^{\beta x_i}}{\sum_i e^{\beta x_i}},$$

wherein β is a parameter that may have a real value. For example, a β having a value of zero results in $h(x_i, \forall i \in label_j)$ performing an averaging function. Whilst a β having a high value (i.e. tending towards infinity) results in $h(x_i, \forall i \in label_j)$ performing a maximum pooling function because it determines the highest value of the $x_i$.

The pooling function is equivalent to average pooling for β=0 and equivalent to max-pooling when β→inf. With a correctly tuned (or chosen) β parameter, the second term will result in high values when no frames lead to a correct recognition, and a much lower value when a sufficient number of frames lead to a correct recognition. Advantageously, this leaves the other frames (i.e. the incorrectly classified frames) unconstrained.

In embodiments $$w_j = \sum_{i \in label j} y_i$$

wherein $y_i$ represents a sound class label for frame i, and $$\sum_{i \in label j} y_i$$

represents a summation of all $y_i$ for frames i having a ground truth of a target sound class j.

The second term may penalise the output data if the correct class is not estimated within a labelled group of frames, for a given "sense of majority", which is defined by the pooling function. An advantage of the second term is that it does not force all the frames to be correctly classified. Advantageously, the machine learning model can consequently operate on detecting parts of an event and/or scene which are easier to detect, instead of being incentivised to detect all of an event and/or scene with equal accuracy.

The summation of $label_j$ may be a sequential set of frames labelled as class j. The term $\Sigma_{i \in label} y_i$ is only one possibility for the weighting term. The class weighting may be equal to 1 for all classes.

The third term may determine $$\Sigma_{i=target\ sound\ class} w_j \text{err}(s(x_i))$$

wherein i represents a frame having a target sound class label, $w_j$ represents a weighting for the target sound class j, $x_i$ represents one or more sound class scores for frame i output by the machine learning model, wherein $s(x_i)$ is configured to output a smoothness of a change of one or more sound class scores across a plurality of frames including frame i.

In embodiments, $s(x_i)=1-(x_i-(x_{i-1}+x_{i+1})/2)^2$. The term $x_{i-1}$ represents one or more sound class scores for a frame i−1 output by machine learning model, wherein the frame i−1 is a frame that has a position in the sequence preceding the frame i. The frame $x_{i+1}$ represents one or more sound class scores for a frame i+1 output by the machine learning model, wherein frame i+1 is a frame that has a position in the sequence after the frame i. In embodiments, more values are used to determine smoothness. For example, a bigger range of frames. Other alternate methods of expressing smoothness may be used.

The fourth term may determine $$\Sigma_j[\Sigma_{i \in label\ j} w_j g(x_i)]$$

wherein j represents a target sound class, $i \in label\ j$ represents a frame i having a ground truth of a target sound class j, $w_j$ represents a weighting for the target sound class j, $x_i$ represents multiple sound class scores for frame i output by the machine learning model, $g(x_i)$ represents a function that is configured to process at least one sound class score for frame i, wherein the at least one processed sound class score is associated with a target sound class other than the sound class j.

Advantageously, the fourth term penalises output data for at least one sound class score for a frame that misclassifies the frame as a target sound class different to a ground truth of the frame. In practice, whereas the first term penalises false positives (i.e. detecting an event and/or scene when there is none), the fourth term penalises detecting a first sound class when the correct detection would be to detect a second sound class.

Generally speaking, if a frame has a ground truth of the non-target sound class, then the first term is determined. However, if a frame has a ground truth of a target sound class, then one or more of the second, third and fourth terms are determined. This means that the loss function can treat missed detection and/or false positives differently to incorrect classifications/detections. This is advantageous because a user of a machine learning model may wish to penalise incorrect classification of a target sound class (i.e. incorrectly classifying a 'baby cry' event as a 'dog bark') more harshly than a missed detection of a target sound class.

In embodiments, the function $g(x_i)=\text{err}\ (1-\text{pool}\ (x_{i,k}, \forall k \neq j))$. The pooling function receives output data for a frame and determines a combination for the output data that is not associated with, or representative of, a target sound class j. The combination may be for example a max value, a median value or a mean value.

In embodiments, $g(x_i)=\text{err}\ (1-\text{pool}_{max}(x_{i,k}, \forall k \neq j))$, wherein $\text{pool}_{max}(x_{i,k}, \forall k \neq j))$ represents a highest sound class score of $x_i$ that is not a sound class score for class j.

The data for each frame of the sequence of frames of audio sound data may comprise one or more acoustic features. The machine learning model may be a neural network. The machine learning model may be any differentiable machine.

Class scores for multiple frames of the sequence of frames may be processed to generate, for each frame, a sound class decision for each frame.

The method may comprise processing the sound class decisions for the sequence of frames to recognise at least one of a non-verbal sound event and a non-verbal sound scene.

The machine learning model may be any one of: a neural network and a Gaussian mixture model.

The method may comprise processing multiple acoustic features for multiple frames of audio data to determine, for each frame of the sequence, one or more sound class scores for the frame that classifies the frame as at least one sound class of a plurality of sound classes; and processing the sound class scores for the frames of the sequence using the or a further machine learning model to detect the non-verbal sound class, wherein the machine learning model has been trained using the described loss function.

The method may further comprise adjusting the sound class scores for multiple frames of the sequence of frames based on one or more of: knowledge about one or more of the sound classes; and knowledge about a sound environment in which the data was captured.

The data for each frame of the sequence of frames of audio data may comprise one or more acoustic features. The sound class scores for multiple frames of the sequence of frames may be operable to generate, for each frame, a sound class decision for each frame. The sound class decisions for the sequence of frames may be operable to recognise at least one of a non-verbal sound event and a non-verbal sound scene.

The method may comprise processing the frames of audio data to extract multiple acoustic features for the sequence of frames of audio data; processing the multiple acoustic features for multiple frames of audio data to determine, for each frame of the sequence, one or more sound class scores for the frame that classifies the frame as at least one sound class of a plurality of sound classes; adjusting, using a machine learning model that has been trained using the described loss function, the sound class scores for multiple frames of the sequence of frames based on one or more of: knowledge about one or more of the sound classes; and knowledge about a sound environment in which the data was captured; and processing the sound class scores for the frames of the sequence to detect the non-verbal sound class.

The described loss function could apply to any machine learning model and is especially advantageous if: a) the machine learning model produces affiliation scores and b) there is a method to tune the model parameters in order to minimise the loss function. For example, the machine learning model can be applied to various DNN architectures, including a feed-forward DNN and a recurrent DNN, using gradient descent as the tuning method to find the minimum loss, but any other tuneable model could use it as long as it performs classification across time series covered by discrete class labels.

In a related aspect there is provided a non-transitory data carrier carrying processor control code which when running on a device causes the device to operate as described.

In a related aspect there is provided a computer system configured to implement the method as described.

In a related aspect there is provided a consumer electronic device comprising the computer system as described.

It will be appreciated that the functionality of the devices we describe may be divided across several modules and/or partially or wholly implemented in the cloud. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), and so forth. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, a digital signal processor (DSP) or a specially designed math acceleration unit such as a Graphical Processing Unit (GPU), a Tensor Processing Unit (TPU) or a NPU (Neural Processing Unit). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit), FPGA (Field Programmable Gate Array), GPU (Graphical Processing Unit), TPU (Tensor Processing Unit) or NPU (Neural Processing Unit), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system. The invention may comprise performing a DNN operation on a GPU and/or an AI accelerator microprocessor, and performing other operations on a further processor.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

Embodiments of the invention will be described, by way of example, with reference to the accompanying drawings, in which.

DETAILED DESCRIPTION OF THE DRAWINGS

Figure 1:
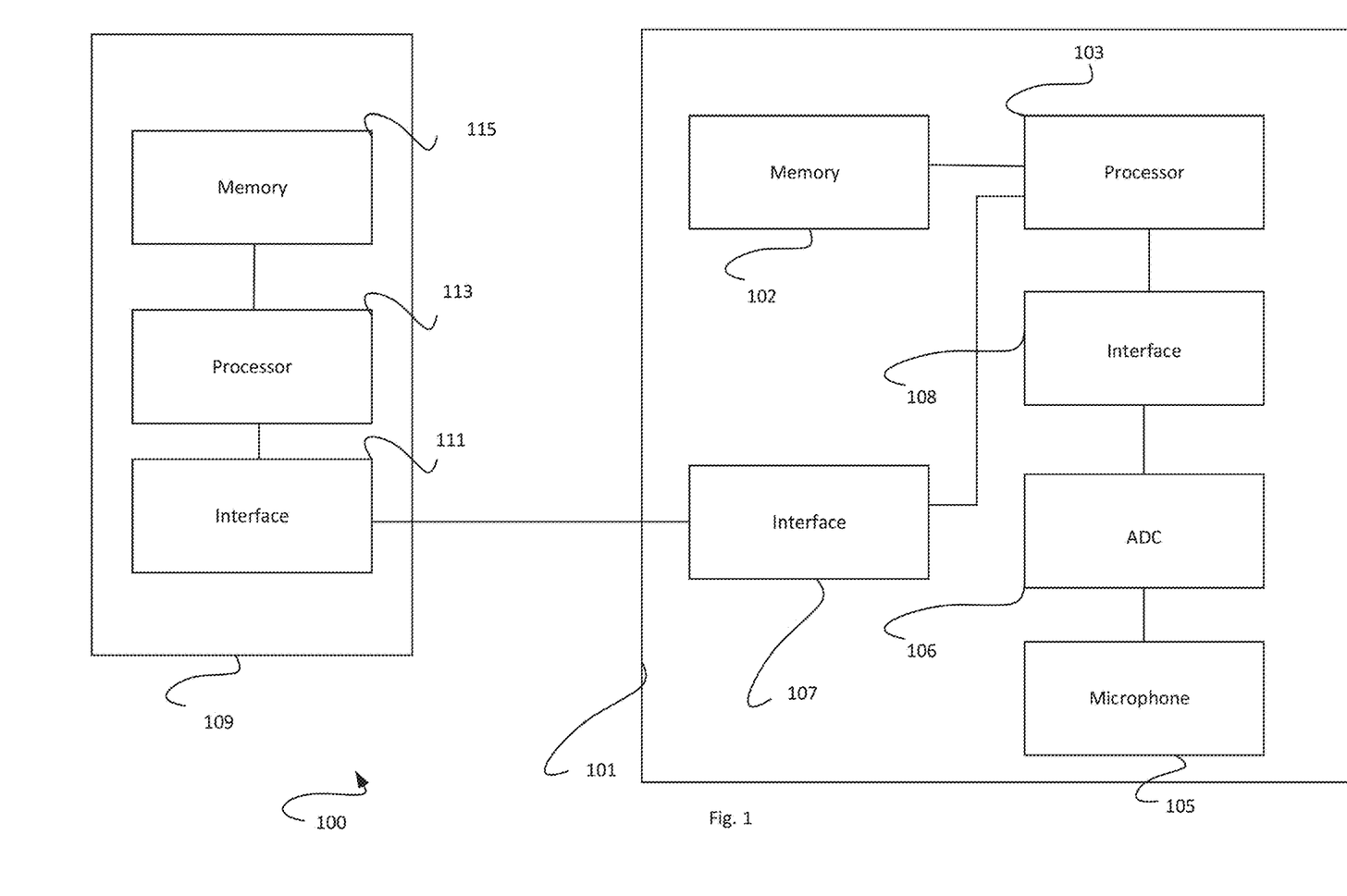
FIG. 1 shows a block diagram of a system 100 configured to recognise a non-verbal sound event and/or scene.

FIG. 1 shows a system 100 configured to recognise a non-verbal sound event and/or scene.

The system comprises a device 101. The device 101 may be any type of electronic device. The device 101 may be a consumer electronic device. For example the consumer electronic device 101 may be, a smartphone, a headphone, a smart speaker, a car, a digital personal assistant, a personal computer, a tablet computer. The device 101 comprises a memory 102, a processor 103, a microphone 105, an analogue to digital converter (ADC) 106, an interface 108 and an interface 107. The processor is in connection to: the memory 102; the microphone 105; the analogue to digital converter (ADC) 106; interface 108; and the interface 107. The processor 103 is configured to recognise a non-verbal sound event and/or scene by running computer code stored on the memory 102. For example, the processor 103 is configured to perform the method 200 of FIG. 2. The processor 103 may comprise one or more of a CPU module and a DSP module. The memory 102 is configured to store computer code that when executed by the processor 103, causes the processor to recognise a non-verbal sound event and/or scene.

The microphone 105 is configured to convert a sound into an audio signal. The audio signal may be an analogue signal, in which case the microphone 106 is coupled to the ADC 106 via the interface 108. The ADC 106 is configured to convert the analogue audio signal into a digital signal. The digital audio signal can then be processed by the processor 103. In embodiments, a microphone array (not shown) may be used in place of the microphone 105.

Although the ADC 106 and the microphone 105 are shown as part of the device 101, one or more of the ADC 106 and the microphone 105 may be located remotely to the device 101. If one or more of the ADC 106 and the microphone 105 are located remotely to the device 101, the processor 103 is configured to communicate with the ADC 106 and/or the microphone 105 via the interface 108 and optionally further via the interface 107.

The processor 103 may further be configured to communicate with a remote computing system 109. The remote computing system 109 is configured to recognise a non-verbal sound event and/or scene, therefore the processing steps required to recognise a non-verbal sound event and/or scene may be spread between the processor 103 and the processor 113. The remote computing system comprises a processor 113, an interface 111 and a memory 115. The interface 107 of the device 101 is configured to interact with the interface 111 of the device 109 so that the processing steps required to recognise a non-verbal sound event and/or scene may be spread between the processor 103 and the processor 113.

Figure 2:
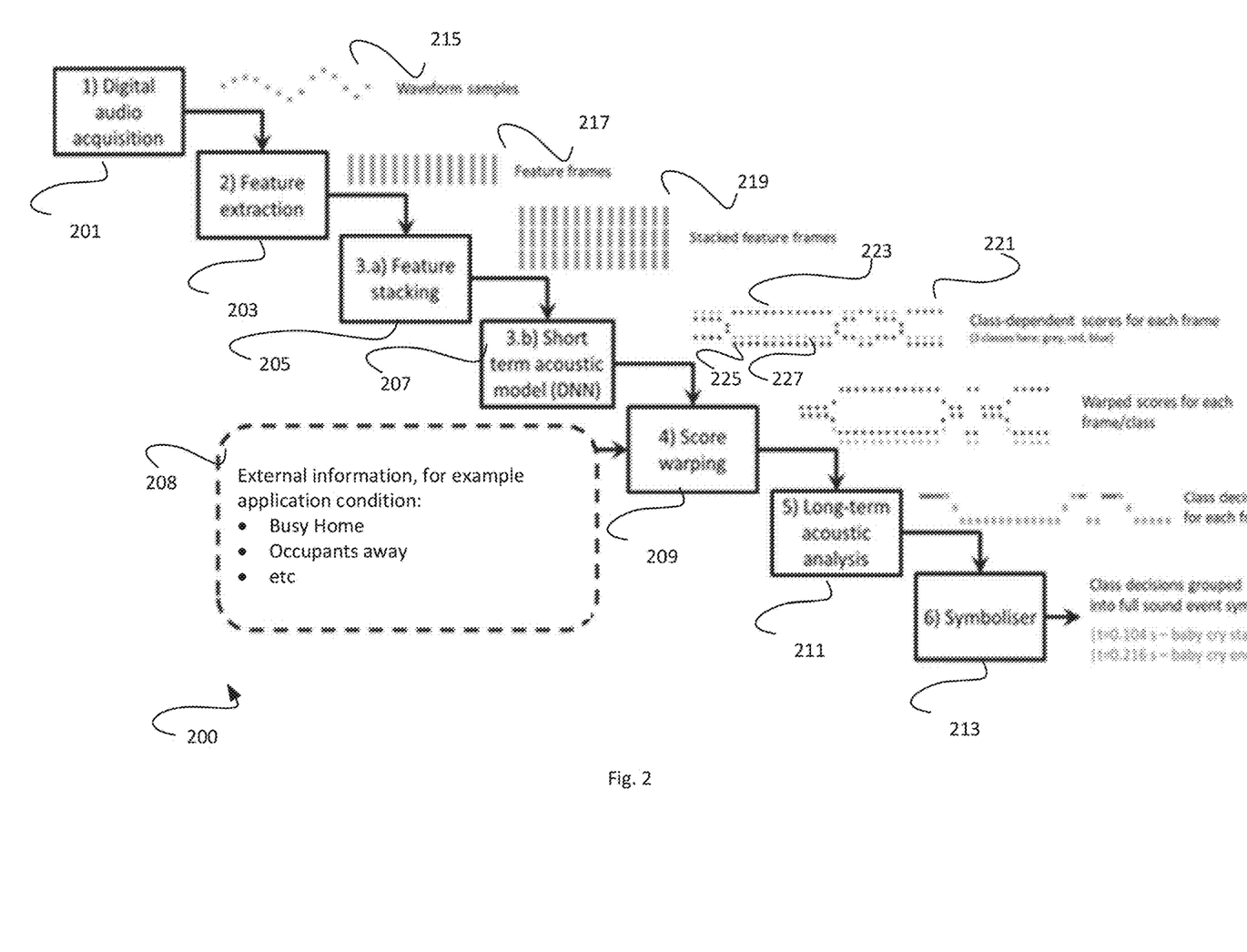
FIG. 2 shows a schematic flow diagram of a method 200 for recognising a non-verbal sound event and/or scene.

FIG. 2 shows a method 200 for recognising a non-verbal sound event and/or scene. The method 200 can be performed by the processor 103 in FIG. 1, or can be split between several processors, for example processors 103 and 113 in FIG. 1.

A step 201 shows acquiring a digital audio sample 215. The audio sample may have been acquired by a microphone, for example microphone 105 of FIG. 1. The audio sample 215 is then converted from an analogue sample to a digital sample by an analogue to digital converter, for example by the analogue to digital converter (ADC) 106 in FIG. 1. The processor 103 is configured to receive the digital sample from the ADC 106 via an interface 108. The microphone 105 and analogue-to-digital (ADC) converter 106 may together perform step 201 to deliver digital audio samples to the processor 103 via the interface 108, for example a serial interface such as I2C. The sampling frequency may be 16 kHz, this means that 16,000 audio samples are taken per second.

The digital audio sample 215 is grouped into a series of 32 ms long frames with 16 ms long hop size. If the sampling frequency is 16 Khz, then this is equivalent to the digital audio sample 215 being grouped into a series of frames that comprise 512 audio samples with a 256 audio samples-long hop size.

Once the digital audio sample 215 has been acquired, feature extraction is performed on the frames of the digital audio sample 215, as shown in the step 203. The feature extraction 203 results in a sequence of feature frames 217. The feature extraction step 203 comprises transforming the digital audio sample 215 into a series of multidimensional feature vectors (i.e. frames), for example emitted every 16 ms. The feature extraction of step 203 may be implemented in a variety of ways.

One implementation of feature extraction step 203 is to perform one or more signal processing algorithms on the frames of the digital audio sample 215. An example of a signal processing algorithm is an algorithm that processes a power spectrum of the frame to extract a spectral flatness value for the frame. A further example is a signal processing algorithm that extracts harmonics and their relative amplitudes from the frame.

An additional or alternative implementation of the feature extraction step 203 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

The feature vector stacking step 205 is an optional step of the method 200. The feature vector stacking step 205 comprises concatenating the acoustic feature vectors 217 into larger acoustic feature vectors 219. The concatenation comprises grouping adjacent feature vectors into one longer (i.e. a higher dimensional) feature vector.

For example, if an acoustic feature vector comprises 32 features, the feature vector stacking step 205 may produce a 352 dimension stacked feature vector by concatenating an acoustic feature vector with 5 acoustic feature vectors before and after the considered acoustic feature vector (352 dimensions=32 dimensions×11 frames, where 11 frames=5 preceding acoustic feature vector+1 central acoustic feature vector+5 following acoustic feature vectors).

An alternative example of the feature vector stacking step 205 would be to stack 15 acoustic feature vectors before and after a central acoustic feature vector, where an original acoustic feature vector having 43 features would produce a stacked acoustic feature vector with 1333 dimensions (1333d=43d×31 acoustic feature vectors, where 31 acoustic feature vectors=15 before+1 central+15 after).

The acoustic modelling step 207 comprises classifying the acoustic features to classify the frame by determining, for each of a set of sound classes, a score that the frame represents the sound class. The acoustic modelling step 207 comprises using a deep neural network (DNN) trained to classify each incoming stacked or non-stacked acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the step 207 is configured to output a score for each sound class modelled by the system every 16 ms.

An example DNN used in step 207 is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A schematic example of an output of the DNN is shown at 221. In this example, there are three different sound classes represented by three colours: grey (227), red (223) and blue (225). The horizontal axis represents time and the vertical axis represents a value of a score (where a downward vertical direction represents a high score). Each dot is a score value corresponding to a frame of audio data.

A score warping step 209 is an optional step that follows 207. In step 209, the scores are reweighted according to probabilities learned from application-related data. In other words, the scores output by the DNN in step 207 are adjusted based on some form of knowledge other than the audio data acquired in step 201. The knowledge may be referred to as external information, examples of such external information can be seen at 208.

As examples, the score warping 209 may comprise the following method: using prior probabilities of sound event and/or scene occurrence for a given application to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

Long-term acoustic analysis is performed at step 211. The long-term acoustic analysis performed at step 211 comprises processing the sound class scores for multiple frames of the sequence of frames to generate, for each frame, a sound class decision for each frame. The long-term acoustic analysis performed at step 211 outputs frame-level classification decisions after integrating longer term temporal information, typically spanning one or several seconds, into the frame-level scoring.

As an example, if there are four sound classes: A, B, C and D, the long-term acoustic analysis performed at step 211 will comprise receiving a sequence of vectors. Each vector would have four dimensions, where each dimension represents a (optionally reweighted) score for a class. The long-term acoustic analysis performed at step 211 comprises processing the multiple vectors that represent a long-term window, typically 1.6 second/100 score values long context window. The long-term acoustic analysis performed at step 211 will then output a series of classification decisions for each frame (i.e. the output will be A, B, C or D for each frame, rather than 4 scores for each frame). The long-term acoustic analysis performed at step 211 therefore uses information derived from frames across a long-term window.

The long-term acoustic analysis can be used in conjunction with external duration or co-occurrence models. For example:

Transition matrices can be used to impart long-term information and can be trained independently of Viterbi. Transition matrices are an example of a co-occurrence model and also implicitly a duration model. Co-occurrence models comprise information representing a relation or an order of events and/or scenes.

An explicit model of duration probabilities can be trained from ground truth labels (i.e. known data), for example fitting a Gaussian probability density function on the durations of one or several baby cries as labelled by human listeners. In this example, a baby cry may last between 0.1 s and 2.5 s and be 1.3 s long on average. More generally, the statistics of duration can be learned from external data. For example, from label durations or from a specific study on a duration of a specific sound event and/or scene.

Many types of model can be used as long as they are able to generate some sort of class-dependent duration or co-occurrence score/weight (e.g., graphs, decision trees etc.) which can, for example, be used to rescore a Viterbi path(s), or alternatively, be combined with the sound class scores by some method other than the Viterbi algorithm across the long term, for example across a sequence of score frames spanning 1.6 s.

Examples of the long-term acoustic analysis performed at step 211 are given below, where the long-term acoustic analysis may thus apply a temporal structure constraint.

Score smoothing and thresholding
Viterbi optimal path search
a recurrent DNN trained to integrate the frame decisions across a long-term window.

In more detail:

a) Score Smoothing and Thresholding Across Long Term Window

Median filtering or some other form of long-term low-pass filtering (for example a moving average filter) may be applied to the score values spanned by the long-term window. The smoothed scores may then be thresholded to turn the scores into class decisions, e.g., when a baby cry score is above the threshold then the decision for that frame is baby cry, otherwise the decision is world ("not a baby"). There is one threshold per class/per score.

b) Viterbi Optimal Path Search Across a Long Term Window

The input of the using the Viterbi algorithm to perform step 211 comprises:

A state-space definition: there are S states where each state ($s\_i$) is a sound class, for example: $s\_0$=world; $s\_1$=baby_cry; $s\_2$=glass_break; etc. In one configuration there are 6 states however, in general there are as many states as there are classes to be recognised plus an extra state representing all other sounds (labelled as a 'world' class (i.e. a non-target sound class) in the above).

An array of initial probabilities: this is a S-sized array, where the i-th element is the probability that the decoded sequence starts with state i. In an example, these probabilities are all equal (for example, all equal to 1/S).

A transition matrix A: this is a S×S matrix where the element (i, j) is the probability of moving from state i to state j. In an example configuration, this matrix is used to block transitions between target classes, for example, the probabilities of the row 0 (world class) are all greater than zero, which means a state can move from world to all other target classes. But, in row 1 (baby cry) only columns 0 and 1 are non-zero, which means that from baby cry the state can either stay in the baby cry state or move to the world state. Corresponding rules apply for the other rows.

An emission matrix: this is a N×S matrix where the element (i, j) is the score (given by the acoustic model, after warping) of observing class j at the time frame i. In an example, N is equal to 100. In this example, the time window is 100 frames long (i.e. 1.6 seconds) and it moves with steps of 100 frames, so there is no overlap.

In other words, every time that the Viterbi algorithm is called, the Viterbi algorithm receives as an input, for example, 100 sound class scores and outputs 100 sound class decisions.

The settings are flexible, i.e., the number of frames could be set to a longer horizon and/or the frames could overlap.

Transition matrices can be used to forbid the transition between certain classes, for example, a dog bark decision can be forbidden to appear amongst a majority of baby cry decisions.

c) DNN Across a Long-Term Window

Examples of a DNN used to perform the long-term acoustic analysis performed at step 211 are:

A long short-term memory recurrent neural network (LSTM-RNN) with 101 stacked frame score vectors (50 frames before and after a target frame), where score frame vectors contain 6 scores (one for each of 6 classes) as input. Thus, the input size is a 101 by 6 tensor. The rest of the DNN comprises 1 LSTM hidden layer with 50 units, hard sigmoid recurrent activation, and tanh activation. The output layer has 6 units for a 6-class system.

A gated recurrent units RNN (GRU-RNN): the input size is similarly a 101 by 6 tensor, after which there are 2 GRU hidden layers with 50 units each, and tanh activation. Before the output layer a temporal max pooling with a pool size of 2 if performed. The output layer has 6 units for a 6-class system.

Long-term information can be inflected by external duration or co-occurrence models, for example transition matrices in case c) of using a Viterbi optimal path search, or inflected by an external model made by learning the typical event and/or scene lengths, for example probabilities of event and/or scene duration captured by some machine learning method, typically DNNs.

At the step 213, the sound class decisions for a sequence of frames are processed to recognise a non-verbal sound event and/or scene. In an example, the sound class decisions for multiple frames are input and an indication of one or more non-verbal sound events and/or scenes are output. Examples of how step 213 may be performed are explained below, one or more of the below examples may be implemented in the step 213:

a) the sound class decisions for each frame may be grouped into long-term event and/or scene symbols with a start time, an end time and a duration;

b) discarding a sequence of sound class decisions of the same class which are shorter than a sound event and/or scene duration threshold defined individually for each sound class. For example: a sequence of "baby cry" sound class decisions can be discarded if the sequence of "baby cry" sound class decisions are collectively shorter than 116 milliseconds (which is approximately equivalent to 10 frames); a sequence of "smoke alarm" sound class decisions can be discarded if the sequence of "smoke alarm" sound class decisions are collectively shorter than 0.4 seconds (which is approximately equivalent to 25 frames). The sound event and/or scene duration thresholds can be set manually for each class;

c) merging multiple non-verbal sound events and/or scenes of the same sound class that intersect a particular time window into one single non-verbal sound event and/or scene. For example, if two "baby cry" non-verbal sound events and/or scenes are determined to happen within a 4 seconds interval then they are merged into one a single "baby cry" non-verbal sound events and/or scenes, where the window duration (4 seconds in the above example) is a parameter which can be manually tuned. The window duration can be different for each sound class.

Figure 3:
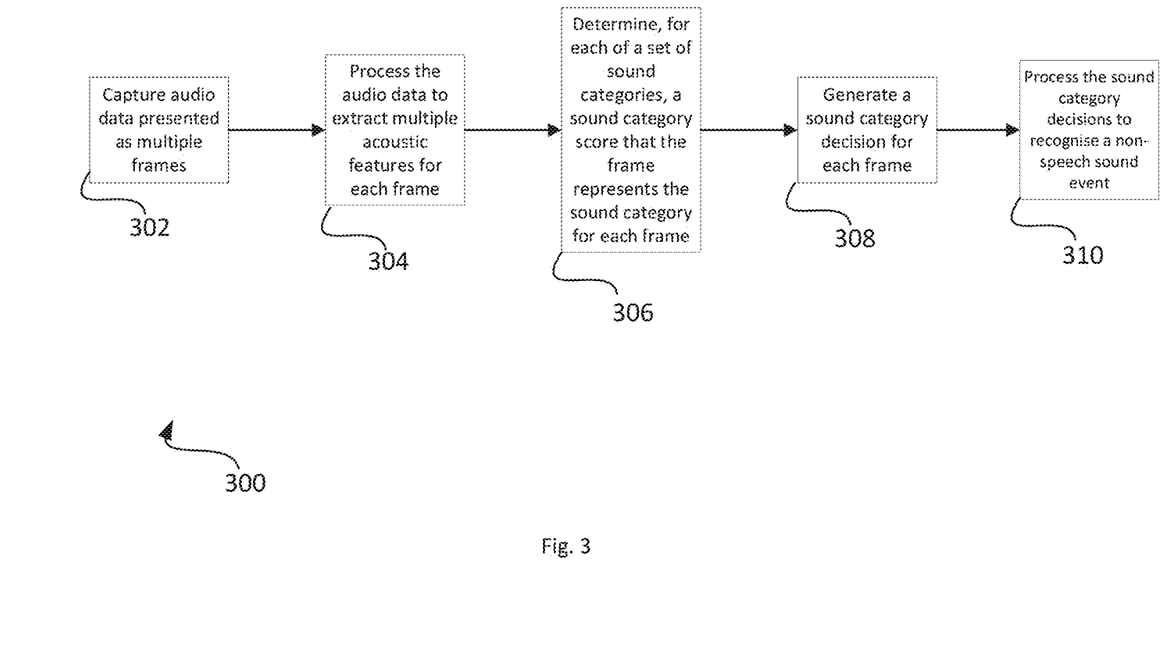
FIG. 3 shows a process 300 for recognising a non-verbal sound event and/or scene using the system of FIG. 2.

FIG. 3 shows a process 300 for recognising a non-verbal sound event and/or scene using the system of FIG. 2.

The first step (302) of the process 300 is to capture audio data comprising multiple frames. The audio data may be captured by the microphone 105 and processed using the ADC 106. The processed audio data is output from the ADC 106 to the processor 103 via the interface 108. The processed audio data may be considered as audio data.

At step 304 the audio data is processed to extract multiple acoustic features for each frame.

At step 306, for each of a set of sound classes, a sound class score that the frame represents the sound class for each frame is determined. Step 306 may comprise classifying the acoustic features to classify the frame by determining, for each of a set of sound classes, a score that the frame represents the sound class.

The next step (308) of the process 300 is to generate a sound class decision for each frame. This is performed by processing the sound class scores for multiple frames of the sequence of frames to generate, for each frame, a sound class decision for each frame.

The next step of the process 300 is to process (step 310) the sound class decisions to recognise a non-speech sound event and/or scene.

In response to recognising a non-speech sound event and/or scene, the system may optionally output a communication to a user device or a further computing device. The system may provide a visual, acoustic, or other indicator in response to recognising a non-speech sound event and/or scene.

Figure 4:
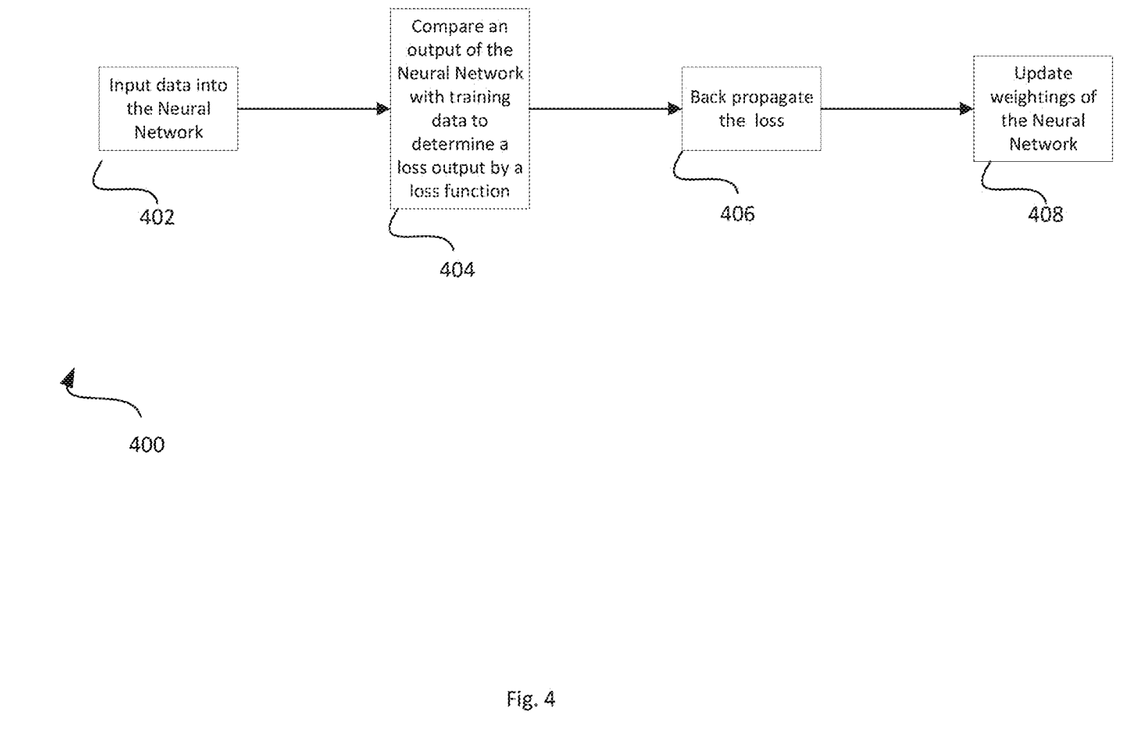
FIG. 4 shows a process 400 for training the machine learning model(s) of the system of FIG. 2.

FIG. 4 shows a process 400 for training the machine learning model(s), for example a neural network, of the system of FIG. 2. FIG. 4 will be discussed in relation to a neural network but other machine learning models may be used.

At step 402, data is input into the Neural Network. In an example, the Neural Network is configured to receive acoustic feature data of multiple frames and output sound class scores for a frame.

At step 404, the output of the Neural Network is compared with training data to determine a loss as determined using a loss function. For example, the outputted sound class scores for a frame are compared to ground truth (sound class labels) for a frame. A loss is calculated for one or more sound classes, preferably a loss is calculated for each of the sound classes.

At step 406, the loss is back propagated. Following the back propagation, the weightings of the Neural Network are updated at step 408.

In an example, a loss function comprising the following features is used to determine a loss. The loss function directly optimises the classification of multi-frame events and/or scenes without resorting to an additional optimisation stage rather than considering only the classification of each short-time audio frame individually.

An example loss function for training the machine learning model(s) of the system of FIG. 2 may be the categorical cross-entropy:

$$-\Sigma_i y_i \log x_i$$

wherein i represents a frame, $y_i$ is a sound class label for frame i, and $x_i$ represents one or more sound class scores for frame i output by the recurrent neural network. $y_i$ may be ground truth and may be a vector comprising labels for each sound class. In this example, the machine learning models may be one or more neural network, and in particular may be a recurrent neural network.

Another example loss function for training the machine learning model(s) of the system of FIG. 2 may have a number of properties:

a) A loss value for incorrectly recognising a frame as having a target sound class when the ground truth label of the frame is a non-target sound class.

b) The loss value for a sound class goes toward zero as more frames having that sound class label are correctly recognised.

c) The loss value for temporally consistent detections on the sound class are less than the temporally inconsistent detections. In other words, chaotic activations are penalized.

d) For target classes, any false activation of the other target classes must also be penalised (missed detections are preferable to cross triggers).

In this example, the machine learning models may be one or more neural network, and in particular may be a recurrent neural network.

Each of these criteria can be enforced with one or more specific penalty terms, each of which are explained in more detail below.

Non-Target Cross Entropy

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio event and/or scenes (that have a corresponding target sound class) in a frame then the frame will be classified as having a non-target sound class. The non-target sound class representative of an absence of each of the one or more target sound classes.

The non-target cross entropy term penalises incorrect and can be determined by:

$$-\Sigma_{i=non\text{-}target\;sound\;class} y_i \log x_i$$

wherein i represents a frame having a ground truth of the non-target sound class representative of an absence of each of the one or more target sound classes, $y_i$ is a sound class label for frame i, and $x_i$ represents one or more sound class scores for frame i output by the recurrent neural network. $y_i$ may be ground truth and may be a vector comprising labels for each sound class.

Target Loss

For a class, in order to successfully recognise the sound event and/or scene associated with the class, it may not be necessary to correctly classify every frame. Rather, it may be sufficient to correctly classify only a percentage of frames associated with the sound event and/or scene. For example, for a sound event and/or scene that typically has a short time duration, it may be advantageous to correctly classify the majority of the frames having the class associated with the sound event and/or scene. For a sound event and/or scene that typically has a long time duration, correctly classifying only a small percentage of the frames having the class could be sufficient. For this purpose, a weighted pooling of the scores within a class can be used. Thus, a term of the loss function may determine:

$$-\Sigma_j[(\Sigma_{i\in label_j} y_i)\log(\text{pool}_\beta(x_i, \forall i\in label_j))]$$

wherein, j represents a target sound class, $i\in label_j$ represents a frame that has been classified as sound class j, $y_i$ is a sound class label for frame i (i.e. the ground truth), $x_i$ represents one or more sound class scores for frame i output by the recurrent neural network, and $\text{pool}_\beta(x_i, \forall i\in label_j)$ is a function of sound class scores and comprises a parameter $\beta$.

The $\text{pool}\beta(\ )$ is the pooling function combining a number of outputs, may be defined as:

$$\text{pool}_\beta(x_i, \forall\; i \in label_j) = \frac{\sum_i x_i e^{\beta x_i}}{\sum_i e^{\beta x_i}}$$

which is equivalent to average pooling for $\beta=0$ and max-pooling when $\beta\rightarrow\inf$.

With a correct $\beta$ parameter, this loss function will lead to high values when no frames create a detection, and much lower values when sufficient number of frames have a detection, leaving the other frames unconstrained.

Smoothness Loss

As discussed above, temporally continuous classifications (i.e. smooth) are preferable to temporally inconsistent classifications as they are more likely to be considered as a recognition. Thus, a loss term that penalizes non-smooth changes in the class on the label can be used as determined below:

$$-\Sigma_{i=target\;sound\;class} y_i \log(1-(x_i-(x_{i-1}+x_{i+1})/2)^2)$$

wherein i represents a frame, $y_i$ represents a sound class label for frame i, $x_i$ represents one or more sound class scores for frame i output by the recurrent neural network, $x_{i-1}$ represents one or more sound class scores for frame i−1 output by the recurrent neural network, wherein the frame i−1 is a frame that has a position in the sequence preceding the frame i; and $x_{i+1}$ represents one or more sound class scores for frame i+1 output by the recurrent neural network, wherein frame i+1 is a frame that has a position in the sequence after the frame i.

Cross-Trigger Loss

In an example, there is a loss term that penalises a frame being classified as more than one class. The loss term increases as other further classes are triggered on the target label (except the world class, since missed detections are not as important). An example term performing such a function is:

$$-\Sigma_j[\Sigma_{i\in label_j} y_i \log(1-\text{pool}_{max}(x_{i,k}, \forall k\neq j))]$$

wherein j represents a target sound class, $i\in label\;j$ represents a frame i having a ground truth of a target sound class j, $y_i$ represents a sound class label for frame i, $x_i$ represents one or more sound class scores for frame i output by the recurrent neural network, $\text{pool}_{max}(x_{i,k}, \forall k\neq c)$ represents a highest sound class score of $x_i$ that is not a sound class score for class c.

The invention claimed is:

1. A method of training a non-verbal sound class detection machine learning system, the non-verbal sound class detection machine learning system comprising a machine learning model configured to:
receive data for each frame of a sequence of frames of audio data obtained from an audio signal;
for each frame of the sequence of frames:
process the data for multiple frames; and
output data for at least one sound class score representative of a degree of affiliation of the frame with at least one sound class of a plurality of sound classes, wherein the plurality of sound classes comprises:
one or more target sound classes; and
a non-target sound class representative of an absence of each of the one or more target sound classes;
wherein the method comprises:
training the machine learning model using a loss function comprising at least one of:
a first term which, for each frame representative of the absence of each of the one or more target sound classes, penalises one or more sound class scores, wherein the one or more sound class scores are associated with at least one of the one or more target sound classes;
a second term which, for a group of frames representative of one of the one or more target sound classes, penalises a combination of one or more sound class scores, wherein the one or more sound class scores are associated with the one of the one or more target sound classes;

a third term which, for each frame of a plurality of frames, penalises a non-smooth change of one or more sound class scores across the plurality of frames; and a fourth term which, for each a frame representative of a first target sound class of the one or more target sound classes, penalises one or more sound class scores, wherein the one or more sound class scores are associated with at least a second target sound class of the one or more target sound classes.

2. The method of claim 1 wherein the first term determines:

$$\sum_{i=a\,non-target\,sound\,class} y_i err(x_i)$$

wherein i represents a frame having a sound class label of the non-target sound class representative of an absence of each of the one or more target sound classes, $y_i$ is a sound class label for frame i, and $x_i$ represents one or more sound class scores for frame i output by the machine learning model, wherein $err(x_i)$ represents a function that is configured to receive a value of $x_i \geq 0$ and output a value greater than or equal to zero.

3. The method of claim 2, wherein $err(x_i)=-f(x_i)\log(x_i)$, wherein $f(x_i)$ is a function configured to receive a value of $x_i \geq 0$ and output a value greater than or equal to zero.

4. The method of claim 3, wherein $f(x_i)=(1-x_i)^\alpha$, wherein $\alpha$ is a real number, preferably wherein $\alpha=1$ or $\alpha=0$.

5. The method of claim 1 wherein the second term determines:
  a product of:
    a weighting; and
    a combination of one or more sound class scores.

6. The method of claim 1 wherein the second term determines:

$$\sum_j w_j\, err(h(x_i, \forall i \in label_j))$$

wherein, j represents a target sound class, $w_j$ represents a weighting for the target sound class j, $x_i$ represents one or more sound class scores for a frame i output by the machine learning model, $err(h(x_i, \forall i \in label_j))$ may represent a function that is configured to receive a value of $h(x_i, \forall i \in label_j)$ and output a value greater than or equal to zero, wherein $h(x_i, \forall i \in label_j)$ represents a function configured to: receive multiple values of $x_i$, wherein each frame i has a ground truth of the target sound class j; combine the multiple values of $x_i$ to generate a combination; and output said combination.

7. The method of claim 5, wherein $h(x_i, \forall i \in label_j)$ is a pooling function.

8. The method of claim 7, wherein the pooling function is $$h(x_i, \forall i \in label_j) = \frac{\sum_i x_i e^{\beta x_i}}{\sum_i e^{\beta x_i}},$$

wherein $\beta$ is a parameter having a real value.

9. The method of any one of claim 6, wherein $$w_j = \sum_{i \in label_j} y_i$$

wherein $y_i$ represents a sound class label for frame i, and $$\sum_{i \in label_j} y_i$$

represents a summation of all $y_i$ for frames i having a ground truth of a target sound class j.

10. The method of claim 1, wherein the third term determines $$\sum_{i=target\,sound\,class} y_i err(s(x_i))$$

wherein i represents a frame having a target sound class label, $y_i$ represents a sound class label for frame i, $x_i$ represents one or more sound class scores for frame i output by the machine learning model, wherein $s(x_i)$ is configured to output a smoothness of a change of one or more sound class scores across a plurality of frames including frame i.

11. The method of claim 10 wherein:

$$s(x_i)=1-(x_i-(x_{i-1}+x_{i+1})/2)^2;$$

$x_{i-1}$ represents one or more sound class scores for a frame i−1 output by machine learning model, wherein the frame i−1 is a frame that has a position in the sequence preceding the frame i; and $x_{i+1}$ represents one or more sound class scores for a frame i+1 output by the machine learning model, wherein frame i+1 is a frame that has a position in the sequence after the frame i.

12. The method of claim 1, wherein the fourth term determines $$\sum_j \left[ \sum_{i \in label_j} y_i g(x_i) \right]$$

wherein j represents a target sound class, $i \in label_j$ represents a frame i having a ground truth of a target sound class j, $y_i$ represents a sound class label for frame i, $x_i$ represents multiple sound class scores for frame i output by the machine learning model, $g(x_i)$ represents a function that is configured to process at least one sound class score for frame i, wherein the at least one processed sound class score is associated with a target sound class other than the sound class j.

13. The method of claim 12, wherein $g(x_i)=err(1-pool_{max}(x_{i,k}, \forall k \neq j))$, wherein $pool_{max}(x_{i,k}, \forall k \neq j)$ represents a highest sound class score of x, that is not a sound class score for class j.

14. The method of claim 1 wherein:
  the data for each frame of the sequence of frames of audio data comprises one or more acoustic features;

the sound class scores for multiple frames of the sequence of frames are operable to generate, for each frame, a sound class decision for each frame; and the sound class decisions for the sequence of frames are operable to recognise at least one of a non-verbal sound event and a non-verbal sound scene.

15. The method of claim 1 wherein the machine learning model is any one of: a neural network and a Gaussian mixture model.

16. A non-transitory data carrier carrying processor control code which when running on a device causes the device to perform the method of claim 1.

17. A computer system configured to implement the method of claim 1.

18. A consumer electronic device comprising the computer system of claim 17.

* * * * *